Aug. 5, 1941.　　　　W. F. CLARK　　　　2,251,325
VIEW REFLECTING DEVICE
Filed Nov. 2, 1938

*Inventor:*
William F. Clark
By Rudolph B. Prentice
*Attorney.*

Patented Aug. 5, 1941

2,251,325

UNITED STATES PATENT OFFICE 2,251,325

VIEW REFLECTING DEVICE

William F. Clark, Portland, Oreg., assignor of one-half to Dewey S. Weiss, Portland, Oreg.

Application November 2, 1938, Serial No. 238,380

1 Claim. (Cl. 88—86)

My invention relates to view reflecting devices of the general type employed on vehicles to afford view of the road both behind and in front from a position laterally removed from the driver's eye and at a higher elevation.

The principal object of my invention is to provide a means by which a view of the road both ahead and behind the driver beyond a vehicle ahead of the driver and normal obstructions rearwardly, may be had.

A second object of my invention is the provision in such a means for the ready adjustment of the device into proper alignment to render visible both the road ahead and behind simultaneously if desired.

A third object is to render distinguishable to the driver the two views of the two portions of the road.

A fourth object is the provision of means for controlling the relative illumination of objects behind and objects ahead so that both may be seen instantly without lapse of time ordinarily required for dilation or contraction of the iris of the eye.

A fifth and summary object of my invention is to enhance the safety with which motor vehicles may be operated on congested thoroughfares.

Other objects and advantages of my invention will be apparent in the following discourse wherein the significance of the reference numerals in the accompanying drawing, details of construction and manner of use of a typical device embodying my invention, and the particular advantages thereof are explained.

Figure 4:
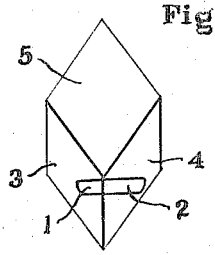
Figure 4 is a diagram illustrating a form of the device which has been found practical.

The device consists essentially of two plane mirrors 1 and 2, Figure 4, comprising oblique surface segments of adjacent faces 3 and 4 of the acute rhombohedron 5 together with structural means to retain the same in rigid relationship with each other and to adjustably secure the same to a car in suitable position for use.

Figure 1:
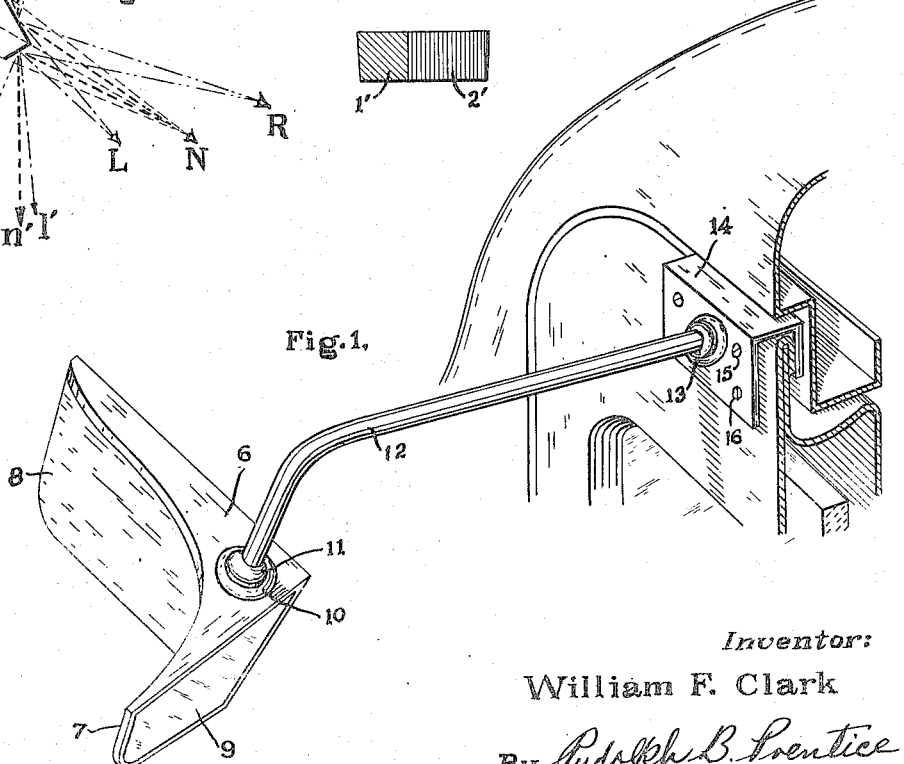
Figure 1 represents a view of the device as attached to the door of a car, in perspective.

The form shown in Figure 1 has been found practical. A rigid metal frame is formed with two panels 7 and 8 made to receive mirrors as 9 and further formed with an extruded spherical surface 10 engaged by a complementary washer 11 urged into frictional contact by suitable spring means not shown, to form a universal joint at the extremity of the rod 12. The opposite end of the rod is similarly attached with a universal joint 13 to a clamp-member 14 adapted to securing to the car door by means of screws as 15 and 16 so that to all intents and purposes the device becomes integral with door itself.

Figure 2:
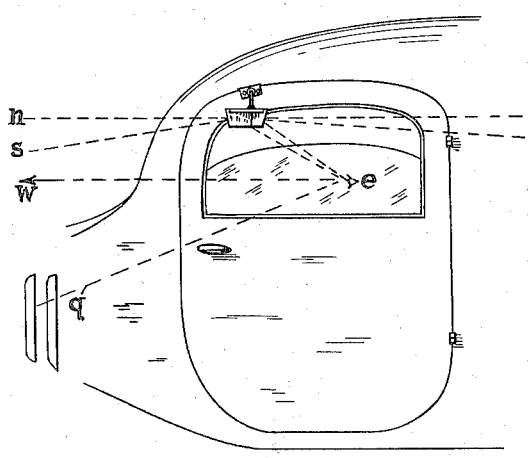
Figure 2 represents a view of a fragment of the side of the car showing the position with reference to the driver's eye in which the device is used together with diagrammatic representations of the lateral aspects of reflected rays.

Now it will be apparent that the precise angle between the two mirrors is more or less a function of the areas of the mirrors. The larger the mirrors, the less critical will be the relationship thereof. However, in order to reduce the bulk of the device to render practical its attachment and use in the manner described, it has been found by experiment that the two mirrors are preferably set at an angle slightly less than a right angle to allow of the alignment of the incident rays $n$ and $n'$ and the convergence of the rays $o$ and $p$ to intersect at the position of the driver's eye at $e$. This relationship takes into account both of the involved vertical and horizontal angles and allows of the disposition of the device high enough above the level of the driver's eye to permit of a clear view laterally as in the direction $q$, Figure 2, and also the setting of the device forwardly of the driver so that both views are available at a glance without turning the head.

Figure 3:
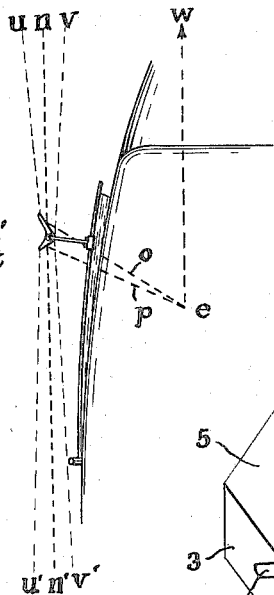
Figure 3 represents a view of a fragment of the top of a car to which the device has been applied showing the car door unlatched to reveal the attachment to the door together with those aspects of reflected rays as would appear in a horizontal projection.

It will also be apparent that the incident rays will be convergent and convey to the driver a view of definite angular magnitude. The relationship just described provides that incident rays as $s$ and $t$ proceeding from lower elevations than the horizontal will reach the driver's eye. Also, the convergent rays $u$, $v$, $u'$, and $v'$, Figure 3, will meet the driver's eye.

A further relationship of great importance is the magnitude of the angle between the rays $o$ and $p$ and the ray $w$, all within the compass of ordinary sight. This relationship is preserved in the vertical aspect illustrated in Figure 2.

Now, because of the setting ahead of the device forward of the driver's eye, another compensation is required. To render both views, forward and backward, of equal angular magnitude it is necessary to make the forward mirror longer than the rear mirror. This relationship is shown in Figure 5 where the angle $a$ is equal to the angle $b$.

Figure 5:
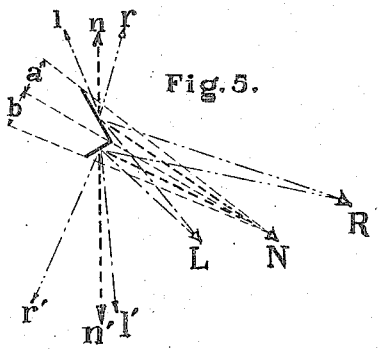
Figure 5 is a diagram illustrating the relationships of the various reflected rays in horizontal projection.

In Figure 5 are shown the results of motions of the driver's head laterally and forwardly. The incident rays $n$ and $n'$ are reflected to the driver's eye at N. If the driver moves his head to the right R and slightly forward his eye will perceive the incident rays $r$ and $r'$ and, likewise, if he move to the left L he will see the rays $l$ and $l'$. Thus, a considerable widening of the range of view is afforded by movement of the head.

Figure 6:
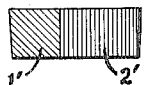
Figure 6 is a diagram illustrating one method of differentiating the front and rear views.

In order to avoid confusion as to which view is which the device shown in Figure 6 is of value. In this figure, the rear-view-mirror 1' is shown as having a greenish tint while the forward-view-mirror 2' has a reddish tint. For night driving these differentiating tints of proper density may be either superimposed or contained within the mirror itself. Thus a bright headlight approaching from the rear would show as green of low light intensity and the red tail-light visible ahead would show its natural color of a seeming intensity brighter than usual because of the wide dilation of the pupils of the eye undisturbed by disproportionate bright flashes from the rear. The two mirrors, thus, cooperate to allow of the normal physiological behavior of the eye and tend to increase visibility.

The coaction of the two mirrors in this relationship is not, however, limited to the functions of sight alone. The fixity of the angular relationship of the two mirrors provides a very important function of the device. At night the driver must make sure of the alignment of his mirrors if reliance upon them is to be had. The forward mirror would normally reflect dimly lighted objects difficult to locate in the presence of the relatively bright lights adjacent the starting point of the traveler where the adjustment of the mirror would be made after the driver is seated. Owing to the fixity of the relationship between the two mirrors, the alignment of the rear view mirror provides automatic alignment of the forward mirror. Approaching headlights being used for the alignment, no difficulty will be encountered and the driver may be assured that his forward mirror is aligned.

The device has proven a great aid to driving both in the daylight and at night and supplies a safety factor of great value especially in the avoidance of head-on collisions.

Having described my invention, what I claim is:

A view reflecting device mounted upon an automobile forward of, above, and laterally removed from the driver's eye comprising a reflector supporting arm secured to said automobile, a rigid body having two reflecting surfaces disposed in planes mutually inclined at an obtuse angle equal to a right angle plus one half the angle subtended to the driver's eye by the respective centers of said reflecting surfaces, and a mounting means on said arm supporting said body adjustably about an axis normal to a plane containing the line of intersection of the planes containing said reflecting surfaces.

WILLIAM F. CLARK.